(12) United States Patent
Kubo et al.

(10) Patent No.: US 10,407,295 B2
(45) Date of Patent: Sep. 10, 2019

(54) FUEL SUPPLY APPARATUS

(71) Applicant: TOYODA GOSEI CO., LTD., Kiyosu-shi, Aichi-ken (JP)

(72) Inventors: Tomohiro Kubo, Kiyosu (JP); Naoki Nishimoto, Kiyosu (JP); Yoshinari Hiramatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 99 days.

(21) Appl. No.: 15/727,746

(22) Filed: Oct. 9, 2017

(65) Prior Publication Data
US 2018/0105414 A1 Apr. 19, 2018

(30) Foreign Application Priority Data

Oct. 14, 2016 (JP) ................................. 2016-202746

(51) Int. Cl.
*B67D 7/32* (2010.01)
*B60K 15/04* (2006.01)
*F02M 37/00* (2006.01)
*B60K 15/035* (2006.01)

(52) U.S. Cl.
CPC ............ *B67D 7/3245* (2013.01); *B60K 15/04* (2013.01); *F02M 37/0076* (2013.01); *B60K 2015/03538* (2013.01); *B60K 2015/047* (2013.01); *B60K 2015/0429* (2013.01); *B60K 2015/0458* (2013.01); *B60K 2015/0483* (2013.01)

(58) Field of Classification Search
CPC ............ B60K 15/04; B60K 2015/0483; B67D 7/3245; F02M 37/0076
USPC .......................................................... 141/350
See application file for complete search history.

(56) References Cited

U.S. PATENT DOCUMENTS

| | | | | |
|---|---|---|---|---|
| 7,293,586 B2 * | 11/2007 | Groom | ................... | B60K 15/04 141/301 |
| 7,302,977 B2 * | 12/2007 | King | ..................... | B60K 15/04 141/302 |
| 7,665,493 B2 * | 2/2010 | Groom | ................... | B60K 15/04 141/350 |
| 7,789,113 B2 * | 9/2010 | Stephan | ................. | B60K 15/04 141/350 |

(Continued)

FOREIGN PATENT DOCUMENTS

| JP | 2009-208517 A | 9/2009 |
|---|---|---|
| JP | 2014-121906 A | 7/2014 |

*Primary Examiner* — Timothy L Maust
(74) *Attorney, Agent, or Firm* — Posz Law Group, PLC

(57) ABSTRACT

An object is to suppress excessive insertion of a fueling nozzle during fueling. A nozzle guide configured to form a nozzle guide path that guides a fueling nozzle is placed inside of a filler neck main body configured to include a fuel passage that introduces a fuel supplied from the fueling nozzle toward a fuel tank. This nozzle guide comprises a first projection for nozzle restriction provided on a nozzle guide end opening portion at an end of the nozzle guide path along a nozzle guide direction and protruded from an end opening circumferential wall of the nozzle guide end opening portion to narrow at least part of a diameter of the nozzle guide path; and a second projection for nozzle restriction provided on a downstream side of the first projection along the nozzle guide direction and protruded from the end opening circumferential wall to narrow at least part of the diameter of the nozzle guide path.

1 Claim, 10 Drawing Sheets

(56) References Cited

U.S. PATENT DOCUMENTS

| | | | | |
|---|---|---|---|---|
| 7,967,041 B2* | 6/2011 | Groom | .................. | B60K 15/04 |
| | | | | 141/350 |
| 8,763,656 B2* | 7/2014 | Ichimaru | ................ | B60K 15/04 |
| | | | | 141/350 |
| 8,899,285 B2* | 12/2014 | Hagano | .................. | B60K 15/04 |
| | | | | 141/350 |
| 9,701,194 B2* | 7/2017 | Groom | .................. | B60K 15/04 |
| 9,783,047 B2* | 10/2017 | Hendler | ................ | B60K 15/04 |
| 9,931,928 B2* | 4/2018 | Kito | ...................... | B60K 15/04 |
| 2008/0041492 A1* | 2/2008 | Gabbey | ................. | B60K 15/04 |
| | | | | 141/350 |

* cited by examiner

FUEL SUPPLY APPARATUS

CROSS-REFERENCE TO RELATED APPLICATION

The present application claims priority from Japanese application 2016-202746 filed on Oct. 14, 2016, the content of which is hereby incorporated by reference into this application.

BACKGROUND

Field

The present disclosure relates to a fuel supply apparatus.

Related Art

A fuel supply apparatus is used to introduce a fuel that is supplied from a fueling nozzle, to a fuel tank and includes a nozzle guide placed inside of a filler neck to guide insertion of the fueling nozzle. For example, a proposed configuration for restricting insertion of the fueling nozzle provides a stopper that is protruded inward in a radial direction at an end of a resin nozzle guide as described in JP 2009-208517A.

SUMMARY

On every occasion of fueling using the fuel supply apparatus, a fueling operator recognizes restriction of nozzle insertion when the inserted fueling nozzle hits against the stopper of the nozzle guide and generally stops insertion of the fueling nozzle at this moment. The fueling operator is, however, likely to misrecognize the restriction of nozzle insertion by the stopper as insertion failure or insufficient insertion of the fueling nozzle and to excessively insert the fueling nozzle. This causes the stopper protruded inward in the radial direction to be excessively expanded and is likely to break the stopper. Such breakage of the stopper may be avoided by increasing the degree of radially inward protrusion of the stopper, in order to prevent excessive insertion of the fueling nozzle. Increasing the degree of radially inward protrusion of the stopper, however, increases the area of the nozzle opening of the fueling nozzle that is covered by the stopper and is likely to interfere with the smooth fueling operation. There is accordingly a need for an insertion restriction technique that suppresses excessive insertion of the fueling nozzle.

In order to solve at least part of the problems described above, the disclosure may be implemented by aspects or configurations described below.

(1) According to one aspect of the disclosure, there is provided a fuel supply apparatus. This fuel supply apparatus comprises a filler neck main body including an opening configured to receive a fueling nozzle inserted therein, and a fuel passage configured to introduce a fuel that is supplied from the fueling nozzle toward a fuel tank; and a nozzle guide placed inside of the filler neck main body on an opening side and configured to form a nozzle guide path that guides the fueling nozzle. The nozzle guide comprise a first projection for nozzle restriction provided on a nozzle guide end opening portion at an end of the nozzle guide path along a nozzle guide direction and protruded from an end opening circumferential wall of the nozzle guide end opening portion to narrow at least part of a diameter of the nozzle guide path; and a second projection for nozzle restriction provided on a downstream side of the first projection along the nozzle guide direction and protruded from the end opening circumferential wall to narrow at least part of the diameter of the nozzle guide path.

In the fuel supply apparatus of this aspect, the fueling nozzle inserted from the opening is guided along the nozzle guide path of the nozzle guide, and nozzle insertion is restricted by the first projection that is protruded from the end opening circumferential wall. When the fueling nozzle is further forcibly inserted, the fueling nozzle reaches beyond the first projection. The second projection on the downstream side of the first projection along the nozzle guide direction serves to restrict nozzle insertion. The fueling operator accordingly recognizes the two sequential restrictions of insertion of the fueling nozzle. The first projection and the second projection that are protruded from the end opening circumferential wall to narrow at least part of the diameter of the nozzle guide path achieve the function of restriction of nozzle insertion. The degrees of protrusion are thus such degrees that come into contact with a nozzle end face of the fueling nozzle. The first projection and the second projection accordingly do not interfere with the opening region of the fueling nozzle. As a result, the fuel supply apparatus of this aspect suppresses excessive insertion of the fueling nozzle during fueling. The nozzle guide readily suppresses excessive insertion of the fueling nozzle by simply protruding the first projection and the second projection from the end opening circumferential wall at the nozzle guide end opening portion.

(2) In the fuel supply apparatus of the above aspect, the first projection and the second projection may be projections protruded from the end opening circumferential wall at different positions about an axis of the nozzle guide path. In the fuel supply apparatus of this aspect, the degree of protrusion of the first projection and the degree of protrusion of the second projection are such degrees that come into contact with the nozzle end face of the fueling nozzle. This configuration enhances the effectiveness of restriction of the nozzle insertion by the first projection and restriction of the nozzle insertion by the second projection.

(3) In the fuel supply apparatus of the above aspect, the first projection may comprise two first projections protruded on the nozzle guide end opening portion to be opposed to each other, and the second projection may be a projection protruded from the end opening circumferential wall in a center region between the two first projections opposed to each other. The forming position of the first projection and the forming position of the second projection are significantly away from each other about the axis of the nozzle guide end opening portion. Even when the nozzle guide end opening portion is deformed at the forming position of the first projection by the fueling nozzle inserted beyond the first projection, this configuration reduces deformation of the nozzle guide end opening portion at the forming position of the second projection. As a result, this configuration does not need to excessively increase the degree of protrusion of the second projection and thereby does not cause the second projection to interfere with the opening region of the fueling nozzle with high effectiveness.

The present disclosure may be implemented by various aspects other than the above aspects of the fuel supply apparatus, for example, a motor vehicle equipped with the fuel supply apparatus or a manufacturing method of the fuel supply apparatus.

BRIEF DESCRIPTION OF DRAWINGS

DESCRIPTION OF EMBODIMENTS (1) General Configuration of Fuel Supply Apparatus FS FIG. 1 is a perspective view illustrating a fill port of a motor vehicle that is equipped with a fuel supply apparatus FS according to an embodiment. FIG. 1 illustrates the fuel supply apparatus FS including a fuel pathway provided to introduce a supplied fuel to a fuel tank (shown in FIG. 3) mounted inside of the motor vehicle, as well as members placed in the vicinity of the fuel supply apparatus FS. A fueling lid FL is supported on the vehicle body of the motor vehicle to be openable and closable. The fueling lid FL includes a lid main body Fla configured along the shape of an outer plate of the vehicle body. The lid main body Fla is supported on the outer plate of the vehicle body to be openable and closable via a hinge Flb. A space exposed by opening the fueling lid FL forms a fueling chamber FR. An open-close device 10 of the fuel tank supported by a base plate BP is placed in the fueling chamber FR. The open-close device 10 of the fuel tank is a mechanism configured to introduce the fuel through the fuel supply apparatus FS to the fuel tank without using a fuel cap. The open-closed device 10 of the fuel tank is also the mechanism configured to open and close the fuel passage by an external force from a fueling nozzle after the fueling lid FL is opened.

FIG. 2 is a perspective view illustrating a fueling nozzle FN inserted into the fuel supply apparatus FS to supply the fuel. FIG. 2 illustrates the state that a nozzle leading end FNa of the fueling nozzle FN is inserted into the open-close device 10 of the fuel tank and that the fuel is supplied to the fuel supply apparatus FS. According to this embodiment, the fueling lid FL is arranged to be opened leftward when the fueling chamber FR is viewed from the front. The fueling nozzle FN inserted into the open-close device 10 of the fuel tank is rotatable counterclockwise about an axis OL1 from the fueling nozzle FN to the open-close device 10 of the fuel tank, while clockwise rotation is restricted by interference with the fueling lid FL. The positional relationship between the fueling nozzle FN inserted into the open-close device 10 of the fuel tank and the fueling lid FL may be modified in various ways.

FIG. 3 is a schematic diagram illustrating a positional relationship of a fuel tank FT mounted inside of the motor vehicle and the fuel supply apparatus FS. The fuel supply apparatus FS includes a filler neck 100, a filler tube 40, a breather pipe 50, a flow control valve 60 and a check valve 30. The filler neck 100 is connected with the fuel tank FT by the filler tube 40 and the breather pipe 50. The filler tube 40 is connected with the fuel tank FT via the check valve 30. The breather pipe 50 is connected with the fuel tank FT via the flow control valve 60. The breather pipe 50 is placed above the filler tube 40 in a vertical direction, so that the supplied fuel passes through the filler tube 40 and does not flow in the breather pipe 50. A fuel vapor vaporized in the fuel tank FT is flowed from the fuel tank FT through the breather pipe 50 and is returned to a fuel passage (described later) formed in the filler neck 100.

(2) Detailed Configuration of Filler Neck 100

Figure 4:
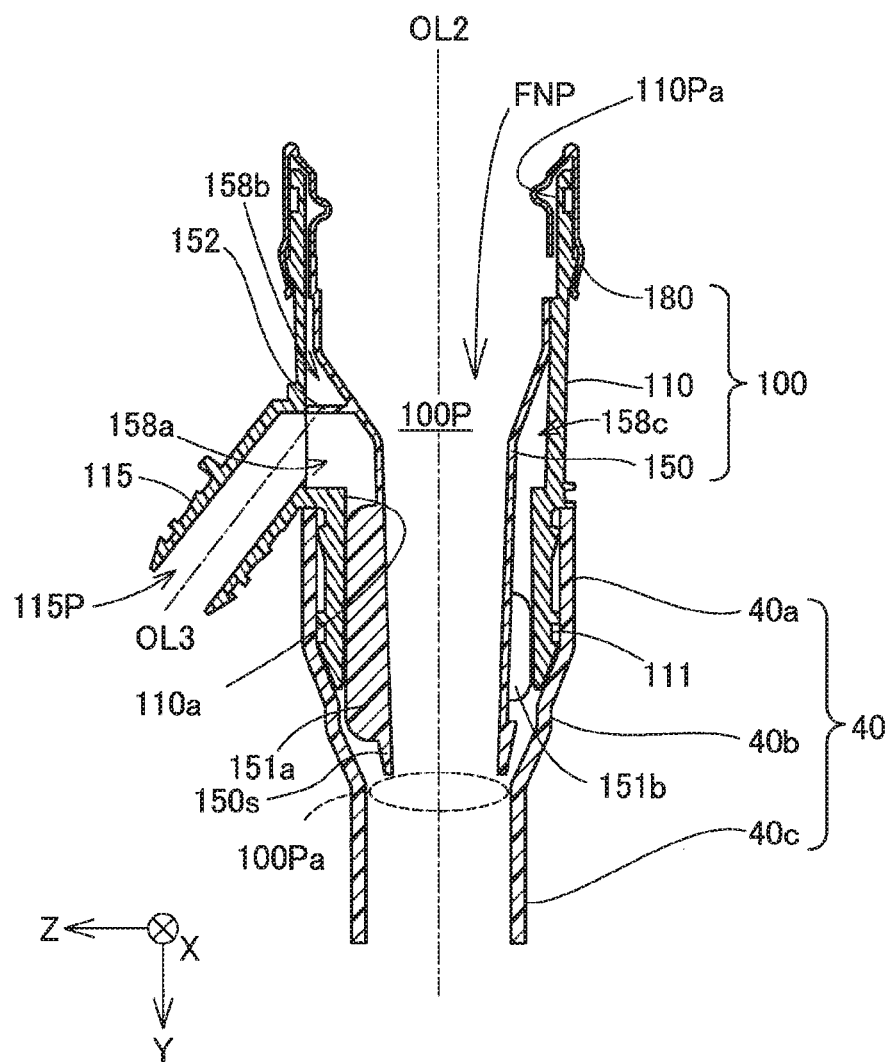
FIG. 4 is a diagram illustrating a sectional view in a longitudinal direction of a filler neck connected with a filler tube.
Figure 5:
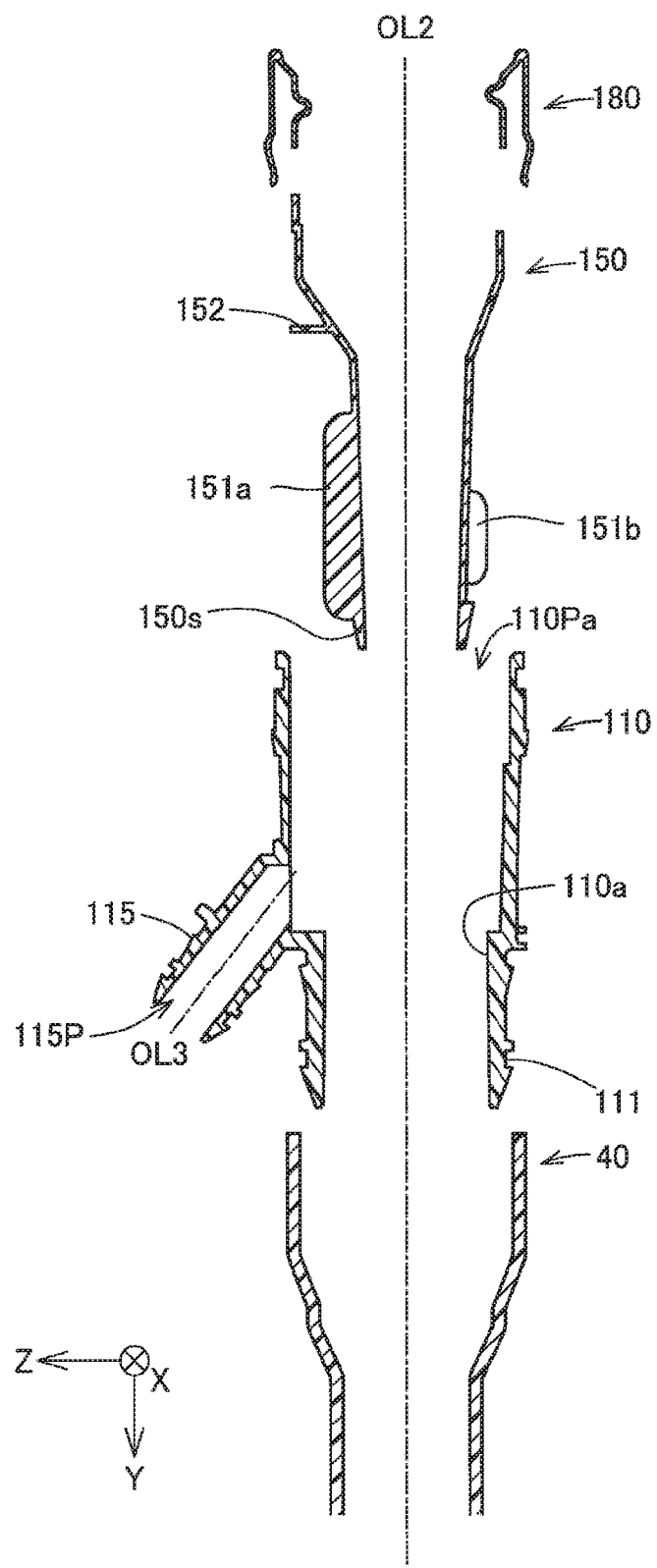
FIG. 5 is an exploded sectional view illustrating the filler tube and filler neck.

FIG. 4 is a diagram illustrating a sectional view in a longitudinal direction of the filler neck 100 connected with the filler tube 40. FIG. 5 is an exploded sectional view illustrating the filler tube 40 and the filler neck 100. For the purpose of understanding the configuration of the respective members, the respective members are shown as sectional end views in both the drawings.

As illustrated, the filler neck 100 includes a filler neck main body 110, a mouthpiece 180 and a nozzle guide 150. The mouthpiece 180 is placed on an upstream side of the filler neck main body 110 and is fit in an opening 110Pa. The fueling nozzle FN is inserted into this opening 110Pa during fueling. According to this embodiment, the fuel supply side (upper side in the drawing) of the filler neck 100 is called upstream side, and the connection side (lower side in the drawing) of the filler neck 100 connected with the filler tube 40 is called downstream side.

Figure 3:
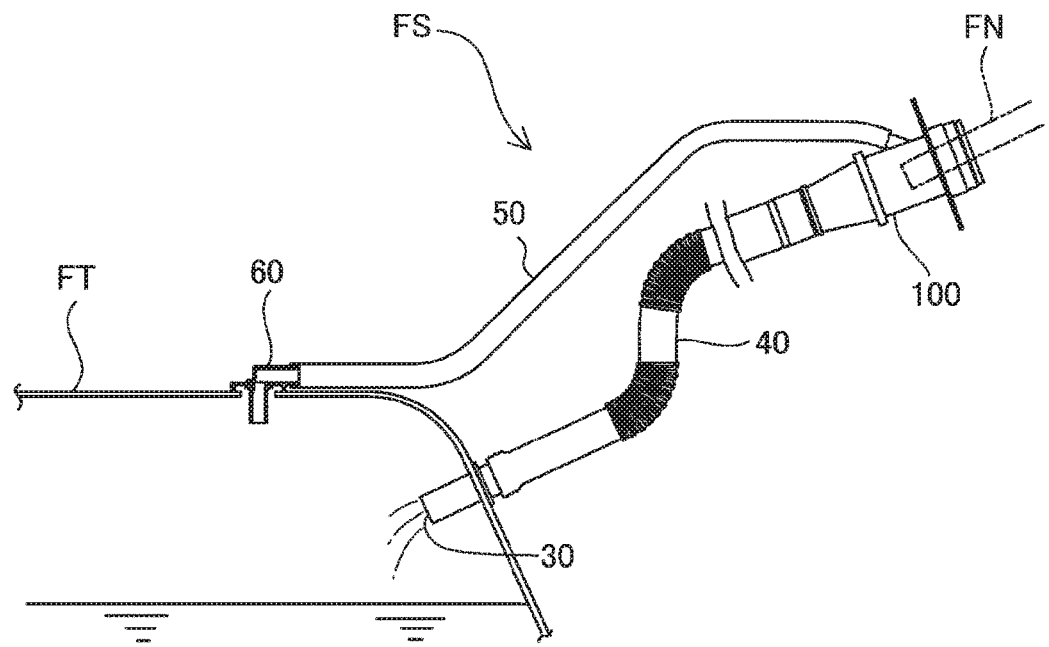
FIG. 3 is a schematic diagram illustrating a positional relationship between a fuel tank mounted inside of the motor vehicle to the fuel supply apparatus.

The filler neck main body 110 is formed in a cylindrical shape connecting the upstream side with the downstream side and includes a breather port 115 that is branched off from the upstream side to the downstream side. The breather port 115 is connected with the breather pipe 50 (shown in FIG. 3) to form an introduction path 115P that introduces the fuel vapor through the breather pipe 50 into a fuel passage 100P. This introduction path 115P is formed as a passage pathway of the fuel vapor about an axis OL3. The filler neck main body 110 including the breather port 115 is made of a resin material having excellent fuel permeation resistance, for example, a polyimide (PA) such as nylon or an ethylene vinyl alcohol copolymer (EVOH), and suppresses permeation of the fuel.

The mouthpiece 180 is a member configured to cover the circular opening 110Pa on the upstream side of the filler neck main body 110. The mouthpiece 180 is made of a metal. According to this embodiment, a direction in which the fuel supplied to the filler neck 100 passes through the fuel passage 100P from the upstream side to the downstream side is defined as a positive direction of a Y axis. A direction that is parallel to a plane perpendicular to an axis OL2 passing through the center of the fuel passage 100P and that intersects with the axis OL2 and the axis OL2 is defined as a positive direction of a Z axis. An axis orthogonal to both the Y axis and the Z axis is defined as an X axis.

The filler neck 100 forms the fuel passage 100P inside thereof from the upstream side to the downstream side along the illustrated Y axis. A passage inner circumferential wall surface 110a is a tapered cylindrical inner circumferential wall surface configured to decrease the sectional area toward the downstream. The fuel passage 100P serves to introduce the fuel supplied from the fueling nozzle FN toward the fuel tank FT. The filler neck main body 110 includes a corrugated portion 111 on an outer circumferential surface on the downstream side that is corrugated to receive the filler tube 40 press fit thereon. The filler neck 100 is manufactured by placing the nozzle guide 150 inside of the filler neck main body 110 and subsequently fitting the mouthpiece 180 in the opening 110Pa of the filler neck main body 110.

The nozzle guide 150 is a member in a cylindrical shape placed on the opening 110Pa-side to be fit inside of the filler neck main body 110. The nozzle guide 150 has an inner circumferential surface that forms a nozzle guide path FNP to guide the fueling nozzle FN in a partial region of the fuel passage 100P on the opening 110Pa-side. The inner circumferential surface of the nozzle guide 150 is formed to decrease the sectional area from the upstream side toward the downstream side. The nozzle guide 150 forms the nozzle guide path FNP configured to decrease the sectional area from the upstream side toward the downstream side. A nozzle guide direction of the fueling nozzle FN in the nozzle guide path FNP is a direction from the upstream side toward the downstream side. The fueling nozzle FN inserted in the fuel passage 100P with the nozzle leading end FNa placed in the nozzle guide path FNP is accordingly guided along the nozzle guide direction from the upstream side toward the downstream side and is introduced to the downstream side of the fuel passage 100P.

The nozzle guide 150 includes a vapor guide element 152 placed at a base portion of the breather port 115. This vapor guide element 152 serves to introduce the fuel vapor, which has been introduced through the introduction path 115P of the breather port 115 to the filler neck main body 110, to the downstream side. A space 158a is formed at the base portion of the breather port 115 by the vapor guide element 152 and the passage inner circumferential wall surface 110a of the filler neck main body 110 to connect the introduction path 115P with the fuel passage 100P. A space 158b is formed on the upstream side of the space 158a by the vapor guide element 152 and the passage inner circumferential wall surface 110a on the upstream side of the filler neck main body 110. This space 158b does not directly communicate with the introduction path 115P. A space 158c is formed at a position symmetrical to the space 158a with respect to the axis OL2 (at a position on a negative direction side of the Z axis) by an outer circumferential surface of the nozzle guide 150 and the passage inner circumferential wall surface 110a of the filler neck main body 110. The space 158a, the space 158b and the space 158c are spaces formed to communicate with each other in a labyrinthine structure by the outer circumferential surface of the nozzle guide 150 and the passage inner circumferential wall surface 110a of the filler neck main body 110.

The nozzle guide 150 includes a main reinforcement rib 151a and sub-reinforcement ribs 151b that are provided on the outer circumferential surface of the nozzle guide 150 between the vapor guide element 152 and a nozzle guide end opening portion 150s on the downstream side to increase the strength of the nozzle guide 150. The sub reinforcement ribs 151b are shorter than the main reinforcement rib 151a. The main reinforcement rib 151a and two sub-reinforcement ribs 151b are provided at equal pitches about the axis OL2. The respective ribs 151a and 151b are provided parallel to the axis OL2 and are protruded from the outer circumferential surface of the nozzle guide 150 outward in the radial direction about the axis OL2. The sub-reinforcement ribs 151b are not symmetrical to the main reinforcement rib 151a with respect to the axis OL2 and are accordingly not shown as sections in FIGS. 4 and 5. According to this embodiment, the nozzle guide end opening portion 150s of the nozzle guide 150 placed inside of the filler neck main body 110 and a downstream-side lower end of the main reinforcement rib 151a formed on the outer circumferential surface of the nozzle guide 150 are located at a position nearer to the fuel tank FT than a downstream-side lower end of the filler neck main body 110. In other words, the lower ends of the nozzle guide 150 and the main reinforcement rib 151a are protruded along the axial direction toward the downstream side of the filler neck main body 110. The fuel supplied from the fueling nozzle FN and the fuel vapor returned through the introduction path 115P to the filler neck main body 110 join together in the neighborhood of a junction portion 100Pa below the lower end of the nozzle guide 150. The nozzle guide 150 is made of a resin material similar to the resin material used for the filler neck 100.

The filler tube 40 includes a press-fit portion 40a that is press fit on the corrugated portion 111, a middle portion 40b that is connected with a downstream side of the press-fit portion 40a, and a flow-in portion 40c that is connected with a downstream side of the middle portion 40b. The middle portion 40b is tapered toward a downstream side end of the corrugated portion 111 to have an inner diameter approximately equal to the diameter on the inner circumference of the corrugated portion 111 of the filler neck main body 110. The flow-in portion 40c forms the fuel passage 100P from the nozzle guide end opening portion 150s of the nozzle guide 150 to the fuel tank FT. The middle portion 40b is protruded toward the downstream side of the corrugated portion 111 to have the larger diameter than the diameter of the flow-in portion 40c. The inner circumference of the flow-in portion 40c is eccentrically arranged to be smoothly connected with the inner circumferential portion of the nozzle guide end opening 150s of the nozzle guide 150 on the lower side in the vertical direction of the vehicle equipped with the fuel supply apparatus FS and on the opposite side (negative direction side of the Z axis) opposite to the breather port 115. A seal ring (not shown) is placed between the corrugated portion 111 of the filler neck main body 110 and the filler tube 40 to prevent the liquid fuel and the fuel vapor from flowing to the outside.

Figure 6:
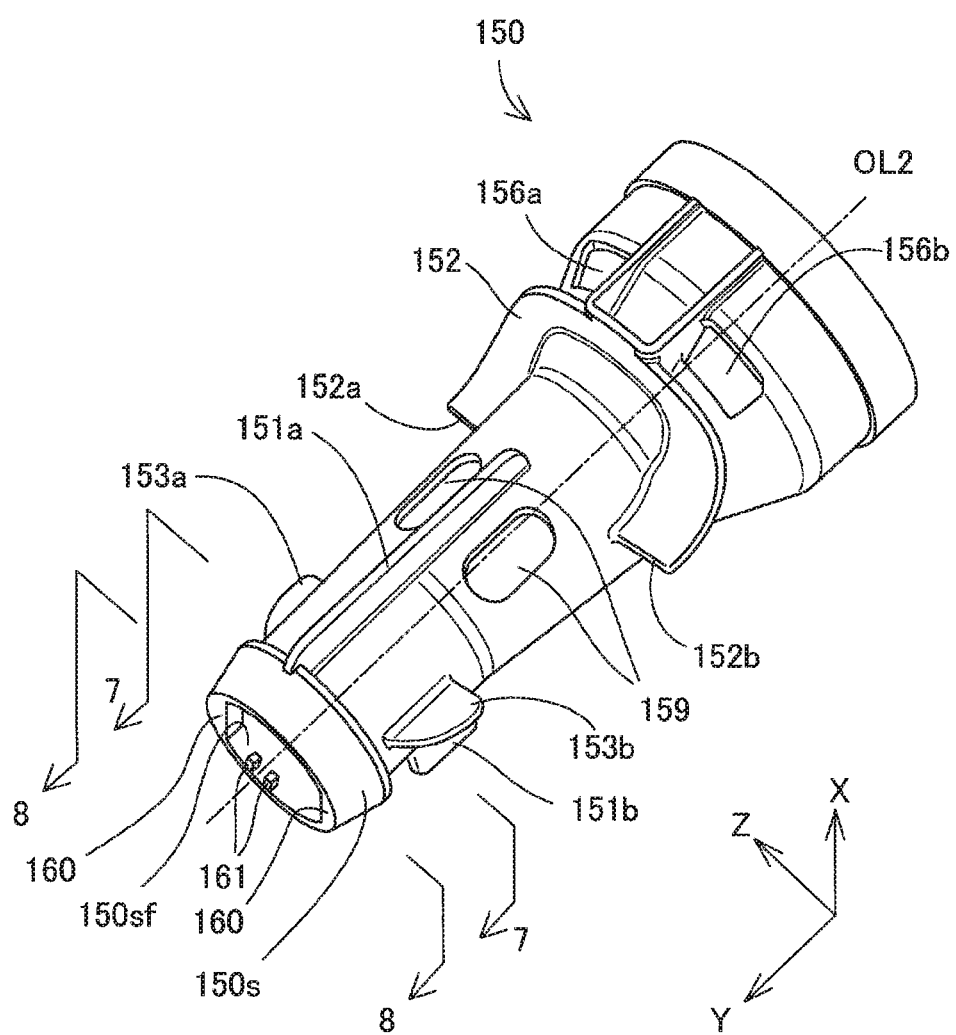
FIG. 6 is a perspective view illustrating the appearance of a nozzle guide.
Figure 7:
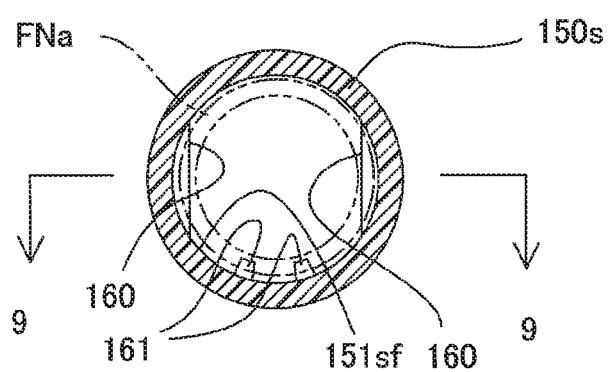
FIG. 7 is a diagram illustrating a section taken along a line 7-7 in FIG. 6.
Figure 8:
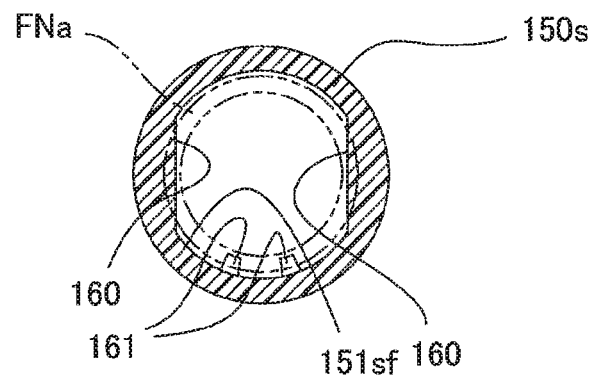
FIG. 8 is a diagram illustrating a section taken along a line 8-8 in FIG. 6.
Figure 9:
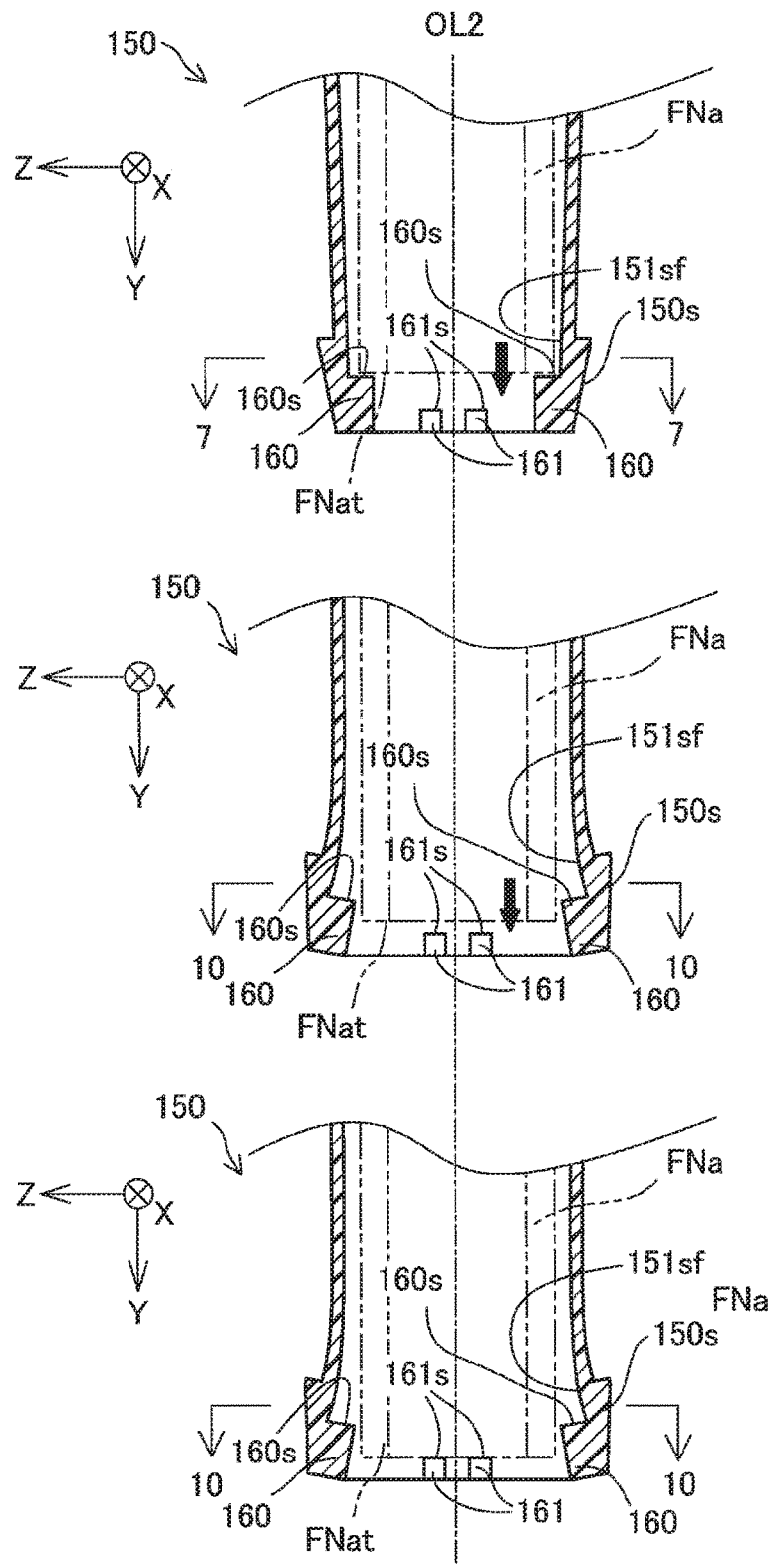
FIG. 9 is diagrams illustrating a nozzle restriction effect of the fuel supply apparatus including the nozzle guide according to the embodiment using sectional views taken along a line 9-9 in FIG. 7.

The following describes the nozzle guide 150 in detail. FIG. 6 is a perspective view illustrating the appearance of the nozzle guide 150. FIG. 7 is a diagram illustrating a section taken along a line 7-7 in FIG. 6. FIG. 8 is a diagram illustrating a section taken along a line 8-8 in FIG. 6. FIG. 9 is a diagram illustrating sections taken along a line 9-9 in FIG. 7.

As shown in FIG. 6, the nozzle guide 150 includes the vapor guide element 152 provided on the upstream side, and first projections 160 and second projections 161 provided on the nozzle guide end opening portion 150s-side at the end of the nozzle guide path FNP along the nozzle guide direction. The vapor guide element 152 is formed to be curved from the upstream side toward the downstream side along the cylindrical outer circumferential surface of the nozzle guide 150 from the outer circumferential side toward the center that is the axis OL2. The vapor guide element 152 is formed in such a shape that does not allow the fuel vapor returned to the introduction path 115P shown in FIG. 4 to directly flow into the space 158c on the opposite side across the axis OL2. The nozzle guide 150 includes a first connection hole 156a and a second connection hole 156b (hereinafter may be collectively called "connection holes 156a and 156b") on the upstream side of the vapor guide element 152. The connection holes 156a and 156b are formed to cause the space 158a, the space 158b and the space 158c shown in FIG. 4 to communicate with the fuel passage 100P. The connection holes 156a and 156b are formed on the upstream side of the vapor guide element 152, so that the fuel vapor passing through the introduction path 115P is introduced to the downstream side by the vapor guide element 152 and does not directly join the fuel passage 100P on the upstream side of the filler neck 100 via the connection holes 156a and 156b. In other words, the fuel vapor is introduced by the vapor guide element 152 and then flows along the outer circumference of the nozzle guide 150 to the connection holes 156a and 156b.

As shown in FIG. 6, the nozzle guide 150 includes a first rectifying rib 153a and a second rectifying rib 153b provided on the cylindrical outer circumferential surface to be away from the vapor guide element 152, and air holes 159 formed between the vapor guide element 152 and the rectifying ribs 153a and 153b. The first rectifying rib 153a is formed on the downstream side of a first downstream end 152a that is one end on the downstream side of the vapor guide element 152 along the axis OL2. Similarly, the second rectifying rib 153b is formed on the downstream side of a second downstream end 152b that is the other end on the downstream side of the vapor guide element 152 along the axis OL2. The first rectifying rib 153a and the second rectifying rib 153b are formed at different positions on the nozzle guide 150 but have identical configurations to be protruded from the cylindrical outer circumferential surface of the nozzle guide 150. The first rectifying rib 153a is formed parallel to the axis OL2. The amount of protrusion of the first rectifying rib 153a outward in the radial direction has a maximum value on the upstream end and decreases toward the downstream side. The first rectifying rib 153a and the second rectifying rib 153b serve to rectify the fuel vapor flowing through the space 158a or the space 158c toward the nozzle guide end opening portion 150s of the nozzle guide 150. The air holes 159 serve to introduce part of the fuel vapor, which flows through the space 158a or the space 158c toward the nozzle guide end opening portion 150s of the nozzle guide 150, directly to the fuel passage 100P.

The first projections 160 provided on the nozzle guide end opening portion 150s are opposed to each other at the nozzle guide end opening portion 150s as shown in FIGS. 7 to 9. The opposed first projections 160 are convexes for nozzle restriction protruded from an end opening circumferential wall 150sf of the nozzle guide end opening portion 150s to narrow at least part of the diameter of the nozzle guide path FNP. The first projections 160 have protrusion upper faces 160s that are protruded from the end opening circumferential wall 150sf and serve as stopper surfaces to come into contact with a nozzle end face FNat of the nozzle leading end FNa of the fueling nozzle FN (shown in FIG. 2).

The second projections 161 provided on the nozzle guide end opening portion 150s are placed on the downstream side of the first projections 160s along the nozzle guide direction of the nozzle guide path FNP. The second projections 161 are convexes for nozzle restriction protruded from the end opening circumferential wall 150sf without interfering with the first projections 160 to narrow at least part of the diameter of the nozzle guide path FNP. The second projections 161 have protrusion upper faces 161s that are protruded from the end opening circumferential wall 150sf and serve as stopper surfaces to come into contact with the nozzle end face FNat of the nozzle leading end FNa of the fueling nozzle FN (shown in FIG. 2). The first projections 160 and the second projections 161 described above are protruded from the end opening circumferential wall 150sf of the nozzle guide end opening portion 150s to be on the inner side of the outer diameter of the fueling nozzle FN, such as not to interfere with the opening region of the fueling nozzle FN. According to this embodiment, the interval between the first projections 160 and the second projections 161 along the nozzle guide direction, i.e., the distance between the protrusion upper faces 160s and the protrusion upper faces 161s along the nozzle guide direction, is set to be approximately 3 to 7 mm. In other words, the protrusion upper faces 161s are located on the downstream of the protrusion upper faces 160s by this distance. The first projections 160 and the second projections 161 described above are projections protruded from the end opening circumferential wall 150sf at different positions about the axis of the nozzle guide path FNP. Additionally, the second projections 161 are projections protruded from the end opening circumferential wall 150sf in a center region between the first projections 160 opposed to each other.

Figure 10:
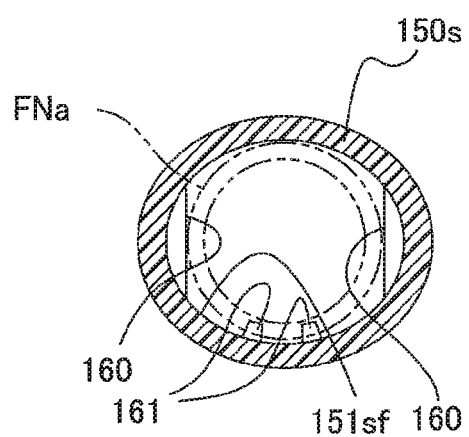
FIG. 10 is a diagram illustrating a section taken along a line 10-10 in FIG. 9.

The fuel supply apparatus FS of the embodiment described above has following advantageous effects. FIG. 9 is diagrams illustrating a nozzle restriction effect of the fuel supply apparatus FS including the nozzle guide 150 according to the embodiment using sectional views taken along the line 9-9 in FIG. 7. FIG. 10 is a diagram illustrating a section taken along a line 10-10 in FIG. 9. FIG. 9 illustrate changes of the projections and their peripheries accompanied with insertion of the nozzle shown by a closed arrow.

The nozzle guide 150 of the fuel supply apparatus FS according to the embodiment is configured to guide the fueling nozzle FN inserted through the mouthpiece 180 that is fit in and attached to the opening 110Pa shown in FIG. 4, along the nozzle guide path FNP of the nozzle guide 150. As shown by the upper drawing of FIG. 9, the nozzle guide 150 has a function of first restriction of nozzle insertion that causes the nozzle end face FNat of the fueling nozzle FN to come into contact with the protrusion upper faces 160s of the first projections 160. In FIG. 7 that is the sectional view of the periphery of the first projections 160, this first restriction is shown as interference of the opposed first projections 160 with the nozzle leading end FNa. In FIG. 7, the second projections 161 seem to interfere with the nozzle leading end FNa. In the nozzle guide 150 of the embodiment, however, the second projections 161 are placed on the downstream side of the first projections 160 that perform the first restriction along the nozzle guide direction in the nozzle guide path FNP. The nozzle end face FNat accordingly does not come into contact with the protrusion upper faces 161s of the second projections 161 in the course of this first restriction.

When the fueling nozzle FN is further forcibly inserted after the first restriction described above, the nozzle guide end opening portion 150s is deformed with expanding the first projections 160 by the outer diameter portion of the fueling nozzle FN, so that the nozzle end face FNat of the fueling nozzle FN reaches beyond the first projections 160 to the downstream side as shown by the middle drawing of FIG. 9. As described above, the second projections 161 are located on the downstream side of the first projections 160 that perform the first restriction. As shown by the lower drawing of FIG. 9, the nozzle guide 150 has a function of second restriction of nozzle insertion that causes the nozzle end face FNat of the fueling nozzle FN to come into contact with the protrusion upper faces 161s of the second projections 161. FIG. 10 illustrates the second restriction as interference of the second projections 161 with the nozzle leading end FNa that reaches beyond the first projections 160 with deforming and expanding the opposed first projections 160 by excessive nozzle insertion after the first restriction.

Figure 1:
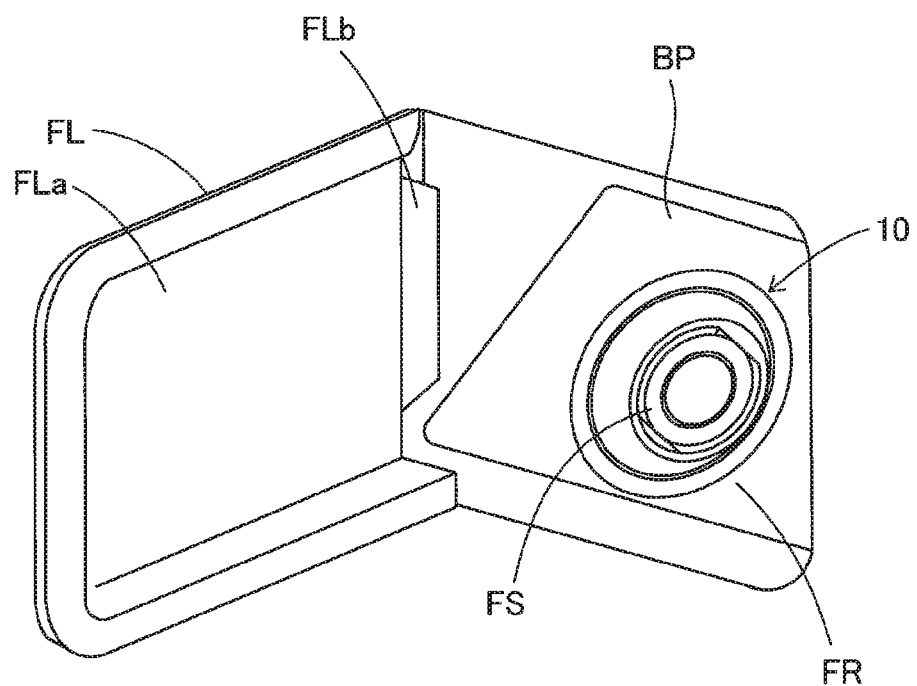
FIG. 1 is a perspective view illustrating a fill port of a motor vehicle that is equipped with a fuel supply apparatus according to an embodiment.
Figure 2:
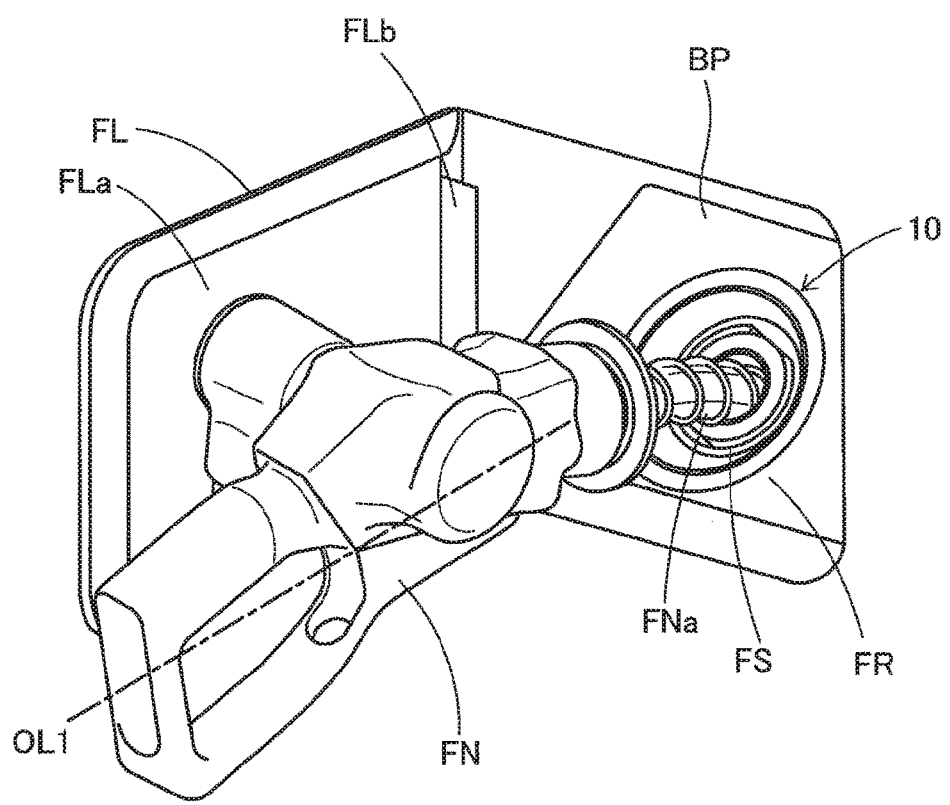
FIG. 2 is a perspective view illustrating a fueling nozzle inserted into the fuel supply apparatus to supply the fuel.

The fueling operator who performs fueling with grasping the fueling nozzle FN shown in FIG. 2 accordingly recognizes the two sequential restrictions, i.e., the first restriction and the second restriction, of insertion of the fueling nozzle FN during nozzle insertion. The first projections 160 and the second projections 161 are protruded from the end opening circumferential wall 150sf to narrow at least part of the diameter of the nozzle guide path FNP and serve the function of nozzle restriction. Both the projections 160 and 161 are protruded to such degrees that come into contact with the nozzle end face FNat of the fueling nozzle FN. The first projections 160 and the second projections 161 accordingly do not interfere with the opening region of the fueling nozzle FN. As a result, the fuel supply apparatus FS including the nozzle guide 150 according to this embodiment suppresses excessive insertion of the fueling nozzle FN during fueling. The nozzle guide 150 readily suppresses excessive insertion of the fueling nozzle FN by simply protruding the first projections 160 and the second projections 161 from the end opening circumferential wall 150sf at the nozzle guide end opening portion 150s.

In the fuel supply apparatus FS of the embodiment, for the purpose of restricting excessive insertion of the fueling nozzle FN, the first projections 160 and the second projections 161 are protruded from the end opening circumferential wall 150sf at different positions about the axis of the nozzle guide path FNP. In the fuel supply apparatus FS of the embodiment, the degree of protrusion of the first projections 160 and the degree of protrusion of the second projections 161 are such degrees that come into contact with the nozzle end face FNat of the fueling nozzle FN. This configuration ensures restriction of the nozzle insertion by the first projections 160 and restriction of the nozzle insertion by the second projections 161 with high effectiveness.

In the fueling device FS of the embodiment, for the purpose of suppressing excessive insertion of the fueling nozzle FN, the first projections 160 are protruded and formed on the nozzle guide end opening portion 150s to be opposed to each other, and the two second projections 161 are formed and protruded from the end opening circumferential wall 150sf to be placed in the center region between the first projections 160 opposed to each other. Accordingly, the protruding and forming positions of the second projections 161 are significantly away from the protruding and forming positions of the first projections 160 about the axis of the nozzle guide end opening portion 150s. Even when the nozzle guide end opening portion 150s is deformed at the protruding and forming positions of the first projections 160 by the fueling nozzle FN inserted beyond the first projections 160, this configuration reduces deformation of the nozzle guide end opening portion 150s at the protruding and forming positions of the second projections 161 as shown by the middle drawing of FIG. 9. As a result, the configuration of the fuel supply apparatus FS of the embodiment does not need to excessively increase the degree of protrusion of the second projections 161 and thereby does not cause the second projections 161 to interfere with the opening region of the fueling nozzle FN with high effectiveness.

In the fuel supply apparatus FS of the embodiment, the distance between the protrusion upper faces 160s and the protrusion upper faces 161s along the nozzle guide direction is set to be approximately 3 to 7 mm. The fueling operator thus promptly recognizes the two sequential restrictions, the first restriction and the second restriction, of nozzle insertion. This configuration accordingly suppresses excessive insertion of the fueling nozzle FN with high effectiveness.

The disclosure is not limited to any of the embodiment, the examples, and the modifications described above but may be implemented by a diversity of other configurations without departing from the scope of the disclosure. For example, the technical features of any of the embodiment, the examples and the modifications corresponding to the technical features of each of the aspects described in SUMMARY may be replaced or combined appropriately, in order to solve part or all of the problems described above. Any of the technical features may be omitted appropriately unless the technical feature is described as essential herein.

In the embodiment described above, the first projections 160 are formed on the nozzle guide end opening portion 150s to be opposed to each other. According to a modification, the first projections 160 may be arranged not to be opposed to each other as long as the first projections 160 serve as the stoppers that come into contact with the nozzle end face FNat of the fueling nozzle FN and restrict the nozzle insertion. For example, the first projections 160 may be formed as convexes like the second projections 161, and the protrusion upper faces 160s of the first projections 160 may be located on the upstream side of the protrusion upper faces 161s of the second projections 161 along the nozzle guide direction of the nozzle guide path FNP.

In the embodiment described above, the two second projections 161 are protruded and formed to be adjacent to each other. According to a modification, only one second projection 161 may be protruded and formed, or two second projections 161 may be protruded and formed to be opposed to each other across the axis OL2. Three or more second projections 161 may be provided.

In the embodiment described above, the first projections 160 and the second projections 161 are protruded and formed at different positions about the axis of the nozzle guide path FNP. According to a modification, the second projections 161 may be protruded and formed at the same positions as the positions of the first projections 160 about the axis of the nozzle guide path FNP. In this modification, the second projections 161 are located vertically above the first projections 160 along the nozzle guide direction of the nozzle guide path FNP. The second projections 161 serving to restrict the nozzle insertion of the fueling nozzle FN beyond the first projections 160 may be protruded and formed not to interfere with the opening region of the fueling nozzle FN even when the second projections 161 come into contact with the nozzle end face FNat of the fueling nozzle FN.

In the embodiment described above, the second projections 161 are formed and protruded from the end opening circumferential wall 150sf in the center region between the first projections 160 opposed to each other. According to a modification, the second protrusions 161 may be protruded and formed in a location other than the center region between the first projections 160 opposed to each other, for example, at the protruding and forming position of one of the first projections 160.

What is claimed is:
1. A fuel supply apparatus, comprising:
   a filler neck main body including an opening configured to receive a fueling nozzle inserted therein, and a fuel passage configured to introduce a fuel supplied from the fueling nozzle toward a fuel tank; and
   a nozzle guide placed inside of the filler neck main body on an opening side and configured to form a nozzle guide path that guides the fueling nozzle, wherein
   the nozzle guide includes:

a first projection for nozzle restriction provided on a nozzle guide end opening portion at an end of the nozzle guide path along a nozzle guide direction and protruded from an end opening circumferential wall of the nozzle guide end opening portion to narrow at least part of a diameter of the nozzle guide path; and a second projection for nozzle restriction provided on a downstream side of the first projection along the nozzle guide direction and protruded from the end opening circumferential wall to narrow at least part of the diameter of the nozzle guide path, the first projection and the second projection are projections protruded from the end opening circumferential wall at different positions about an axis of the nozzle guide path, the first projection is one of two first projections protruded on the nozzle guide end opening portion to be opposed to each other, and the second projection is a projection protruded from the end opening circumferential wall in a center region between the two first projections opposed to each other.

* * * * *